UNITED STATES PATENT OFFICE.

WILLIAM REID KNOX, OF NEWARK, NEW JERSEY.

HYDRAULIC FIREPROOF CEMENT.

SPECIFICATION forming part of Letters Patent No. 706,760, dated August 12, 1902.

Application filed July 23, 1901. Serial No. 69,432. (No specimens.)

*To all whom it may concern:*

Be it known that I, WILLIAM REID KNOX, a citizen of the United States, residing at Newark, in the county of Essex and State of New Jersey, have invented certain new and useful Improvements in Hydraulic Fireproof Cement; and I do hereby declare the following to be a full, clear, and exact description of the invention, such as will enable others skilled in the art to which it appertains to make and use the same.

My invention relates to mineral compounds; and it consists, substantially, of certain specified combination and commingling of ingredients, the preferred proportion whereof and manner of intimately associating the same will be set forth in the following specification, it being understood that I desire to comprehend in this application all substantial equivalents and substitutes which may be considered to fall fairly within the scope and purview of my invention.

The prime object of my invention is to make it possible to produce a very reliable and valuable grade of hydraulic cement without the necessity of resorting to kilns or baking-furnaces therefor.

Other objects and advantages will be made fully apparent from the following specification, it being deemed unnecessary to accompany this application with drawings, inasmuch as any well-known means—as, for instance, a grinding or mixing mill—may be employed, while the usual accessories of a cement factory used for sifting and incorporating hydraulic cement and insuring that the same will form a homogeneous mass may be utilized.

It is well known to those familiar in the art that it is regarded as a prerequisite essential in the production of hydraulic cement that more or less expensive kilns or furnaces must be provided to roast the product of the rock-grinding mills. In the production of my improved hydraulic cement I entirely eliminate the process of burning, as I have determined by chemical analysis and careful investigation the exact physical constituency of the best grades of hydraulic cement, and I therefore have the simple problem before me of supplying in proper form the ingredients found in cement-rock, which I thoroughly incorporate or commingle so as to produce a high grade of hydraulic cement. It therefore follows that by the elimination of the process of burning I am able to produce my cement at a much lower cost than has heretofore been possible. The basic part of my cement may be found in almost every locality of the United States, Canada, Mexico, and elsewhere, inasmuch as I employ as said base any of the shale measures or soapstone or hard clay shales, slag, or, in fact, any similar substances which when pulverized will not become inert matter. This shale, &c., I reduce to a flour or thoroughly pulverized condition by the use of a proper mill. This basic element, consisting of pulverized shale, clay, &c., in itself comprises many of the essential elements required in the formation of a perfectly-acting hydraulic cement.

My cement compound in its complete state is formed as follows in the production, of say, one hundred pounds of the complete cement, to wit: silica or silex, twenty-four pounds; alumina, six and one-half pounds; magnesia, five pounds; lime, sixty pounds; muriatic acid, three pounds; iron oxid, one and one-half pounds.

It will be obvious that I wish to reserve the right to slightly change the proportion of said ingredients, inasmuch as I am able to vary the hydraulic qualities of my cement by varying the proportion of ingredients employed—as, for instance, the hydraulic property of my cement may be increased by increasing the amount of muriatic acid employed and diminished by lessening the amount of such acid.

My improved hydraulic cement will, it has been demonstrated by experiment, sustain a heavier load and will therefore withstand a greater compression-point than other hydraulic cements.

My cement may be readily manufactured without the necessity of providing an expensive and especially-designed plant with furnaces therefor, it being unnecessary to as thoroughly pulverize or grind the shale-rock as is required to produce hydraulic cement where the burning process is maintained.

I have demonstrated by experiment that my cement will attain a greater hardness in a given time than other cements which I have employed in various situations, and I confidently believe that when my cement has been allowed to remain standing for six years it will attain the degree of hardness of natural granite, becoming practically the equivalent of stone.

My observation leads me to believe that the process of burning cement-rock, as is now common, causes the loss of a certain percentage of its original weight and body, and my cement is therefore of greater specific gravity than the burned product. Being of greater specific gravity, it will be found especially valuable for hydraulic work, and, as above set forth, the hydraulic property may be readily increased or diminished to meet the requirements of all classes of work. By thus determining by chemical analysis the actual ingredients contained in cement-rock or the best grade of commercial cement and supplying and commingling such ingredients and entirely eliminating the burning process it will be readily obvious that my product may be produced at a minimum charge, and I therefore lay great stress upon the elimination of such burning process in the hydraulic cement, and said elimination therefore constitutes the essential feature of my invention. My hydraulic cement thus produced is found by experiment to be practically fireproof and that the walls of a burning building will therefore remain standing even after a severe fire.

Having thus fully described the preferred combination of elements, what I claim as new, and desire to secure by Letters Patent, is—

An improved hydraulic cement comprising the following ingredients necessary to produce one hundred pounds of cement, viz. silica, twenty-four pounds, alumina six and one-half pounds, magnesia, five pounds, lime, sixty pounds, muriatic acid, three pounds, iron oxid, one and one-half pounds.

In testimony whereof I affix my signature in presence of two witnesses.

WILLIAM REID KNOX.

Witnesses:
JAMES HART,
ANDREW POWERS.